UNITED STATES PATENT OFFICE.

MARK W. MARSDEN, OF PHILADELPHIA, PENNSYLVANIA.

BUILDING MATERIAL.

No. 828,041.      Specification of Letters Patent.      Patented Aug. 7, 1906.

Application filed January 12, 1905. Serial No. 240,829.

*To all whom it may concern:*

Be it known that I, MARK W. MARSDEN, a citizen of the United States, residing at Philadelphia, in the county of Philadelphia and State of Pennsylvania, have invented certain new and useful Improvements in Building Material, of which the following is a specification.

One object of the invention is to provide a material possessed of comparatively great tensile and compressive strengths, of fire-resisting properties, and of lightness in respect to bulk and which shall be easy of manufacture, inexpensive, and constructed largely from waste materials.

Another object of the invention is to provide an expeditious method of making such material and of imparting to it, without baking, a structure such that when struck the material gives forth a metallic ring.

Other objects of the invention will appear from the following description.

The building material may be used in the form of blocks of any appropriate shape, or it may be mixed with sand and applied like plaster. The material consists of a filler containing comparatively considerable carbon and a suitable binder, as calcined gypsum, in the proportions, by weight, of sixty per cent., more or less, of the filler and forty per cent., more or less, of the gypsum or binder. These proportions may, however, be considerably varied to fit the material for different conditions of use.

To practice the invention, I take unconsumed coal, clinkers, and ashes, being the residue of the combustion of anthracite or bituminous coal or coke, and comminute or grind the same so that it will pass through a No. 30 screen. To this granular material, which may be referred to as the "filler" and which consists principally of sharp grains or granules of silica, silicate of alumina, and unburned coal, is added a suitable binder, such as calcined gypsum in powdered form. To these ingredients there may be added salt, one-half per cent., and sulfate of iron, one-half per cent. The chlorid of sodium or salt and sulfate of iron when present operate to form a glaze on the surface of the material, if it should be heated, as by exposure to a conflagration or fire.

The ingredients are mixed with water, as will be described, and the material can be molded to the form of blocks of appropriate shape, or it may be mixed with sand, and a suitable so-called "retarder" for this purpose, such as glue or its equivalent, can readily be obtained upon the market and is frequently used with known plasters. If the glaze consisting of salt and sulfate of iron is to be employed, these are dissolved in water. Water with or without glaze materials is employed to combine the filler and binder. The mixture can then be poured or run into suitable molds, in which it can remain for fifteen or twenty minutes and be then taken out to dry. When the water is added and for some time thereafter, there appears to occur some chemical action, the nature of which is not altogether clear, but its occurrence is evidenced by the heating of the material, the temperature of which rises from that of ordinary cold water to such a degree that the material becomes as hot as can be comfortably borne by the hand. If the material is to be used as plaster, the sand and retarder are added prior to or along with the water and the material is applied to the walls or other articles instead of being run into molds or otherwise fashioned. When it is desired to accelerate or effect a quick hardening of the mass, a one-per-cent. solution of dextrin or its equivalent may be added. When the dextrin is present as one of the ingredients, the proportions are one pound, more or less, dextrin to one hundred pounds, more or less, of dry material.

If the material is to be used for outside work, where it will be exposed to changing temperatures and to all kinds of weather, it is of advantage to use a binder consisting of cement and gypsum in powdered form in the proportions, by weight, of two-thirds, more or less, cement and one-third, more or less, gypsum.

A building material such as described is fireproof and weatherproof. It is further characterized by great tensile and compressive strength and extreme lightness in respect to bulk. For example, a block of the dimensions of an ordinary red brick possesses about half the weight of the latter and will resist a far greater crushing strain. Another feature of the new material is that when plastic it can be molded to any form or shape and when hard it can be sawed and worked with the same facility as timber.

It will be obvious to those skilled in the art to which the invention appertains that modifications may be made in detail without departing from the spirit thereof. Hence the invention is not limited other than the prior state of the art may require; but,

Having thus described the nature and objects of my invention, what I claim as new, and desire to secure by Letters Patent, is—

1. A fire and weather resisting material adapted upon the application of water for building purposes, consisting of uniformly-ground coal, clinkers and ashes, and a binder of cement and calcined gypsum in powdered form, substantially as specified.

2. Building material consisting of a suitable binder, a material to accelerate hardening, a filler consisting principally of ground or comminuted coal, clinkers, and ashes, and a glazing medium, substantially as specified.

3. Building material consisting of the product of a mixture of cement and gypsum, sand, a material to accelerate hardening, water containing glazing materials in solution, and ground or comminuted coal, clinkers, and ashes, substantially as specified.

4. Building material consisting of the product of a mixture of cement and gypsum, sand, a material to accelerate hardening, ground or comminuted coal, clinkers, and ashes, and water containing in solution glazing material responsive to heat, substantially as specified.

In testimony whereof I affix my signature in presence of two witnesses.

MARK W. MARSDEN.

Witnesses:
JAS. A. RICHMOND,
ARTHUR E. DOWELL.